April 21, 1936. S. A. DANNA 2,038,421
COMBINED MILK BOTTLE HOLDER AND LOCK THEREFOR
Filed Nov. 16, 1934 2 Sheets-Sheet 2
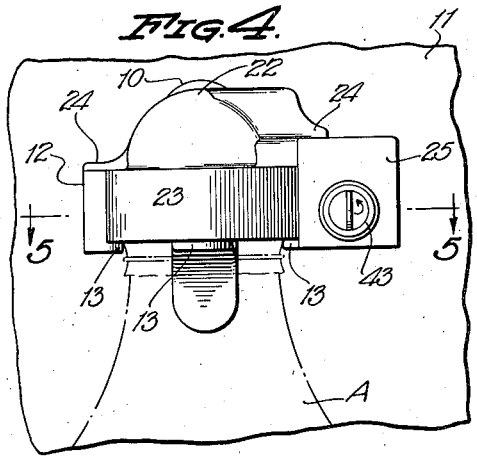
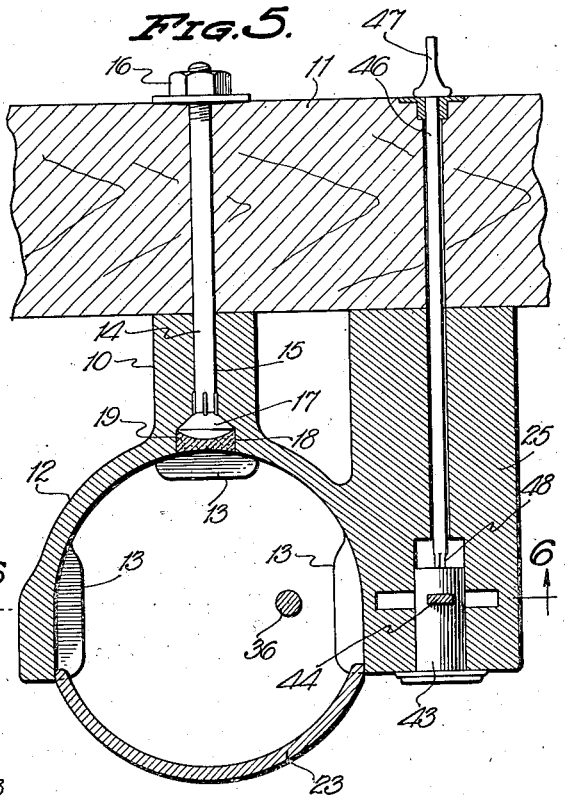
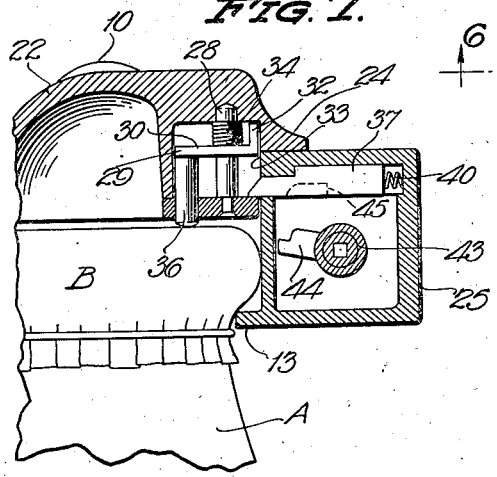
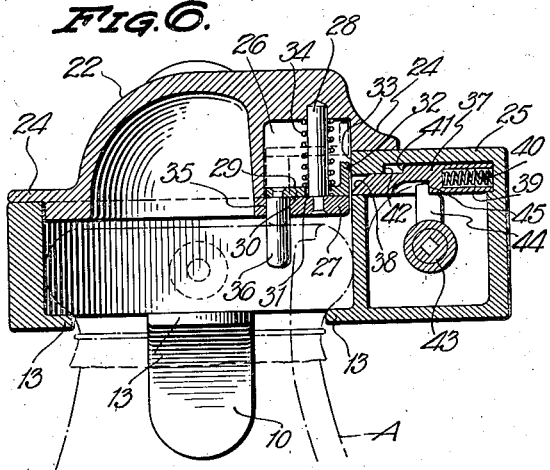
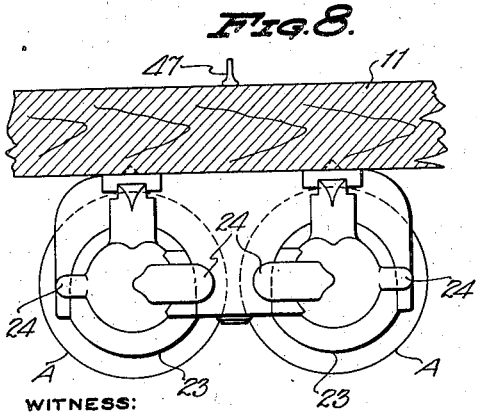
SALVATORE A. DANNA.
INVENTOR Patented Apr. 21, 1936

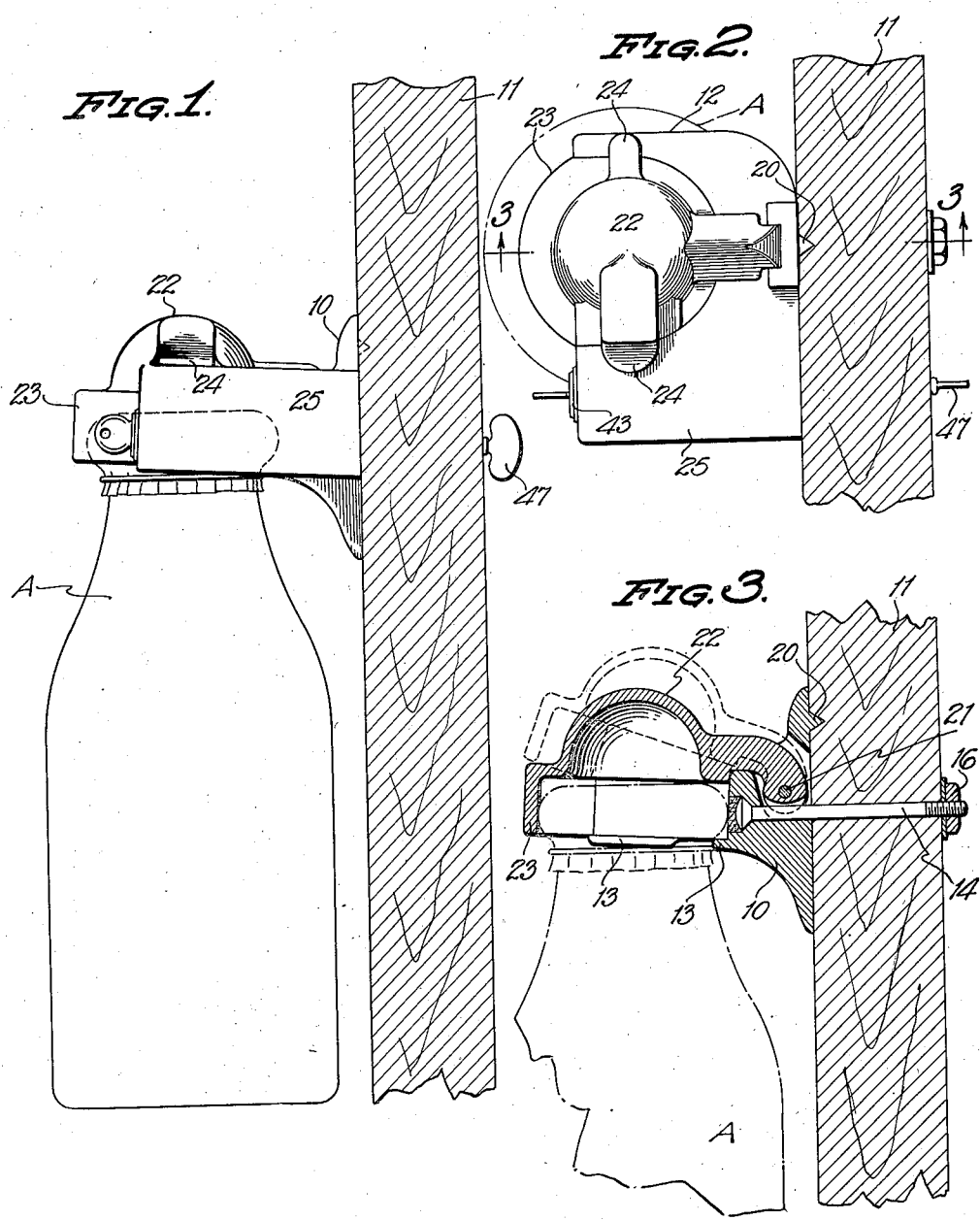

2,038,421

UNITED STATES PATENT OFFICE 2,038,421

COMBINED MILK BOTTLE HOLDER AND LOCK THEREFOR

Salvatore A. Danna, New York, N. Y.

Application November 16, 1934, Serial No. 753,295

3 Claims. (Cl. 232—41)

This invention relates to improvements in milk bottle holders, and more particularly to a combined milk bottle holder and lock therefor.

One of the main features of the invention resides in a device which may be mounted exteriorly of a dwelling or apartment to receive a bottle of milk delivered by a milk man and which automatically locks the bottle to a support against theft.

Another feature of the invention is to provide an anti-theft device for milk bottles which may be locked only when a bottle of milk is placed therein to prevent accidental or mischievous locking of the device when empty and which would prevent the placing of a bottle of milk therein by the milk delivery man.

A further feature of the invention is the provision of a milk bottle holder and lock for mounting upon the exterior of a door, and in which a delivered bottle of milk may be easily inserted and locked, and which may be unlocked from the inside of the door or from the outside thereof by an authorized person having the proper key to facilitate the removal of the bottle of milk.

A further feature of the invention resides in a milk bottle holder wherein the closure cap of a full bottle of milk releases the lock mechanism for operation, thus empty bottles to be picked up by the milk man may be placed in the holder and freely removed without the aid of a key and replaced by a full bottle.

A still further feature is to provide a device of the kind mentioned which suspends a milk bottle from a supporting structure to elevate the same above the ground or floor, and which includes a cover which is locked over the mouth end of the bottle to maintain the same in a sanitary condition. By so elevating the bottle, the same is disposed out of the reach of cats and dogs to prevent contamination caused by such animals licking the tops of full bottles of milk.

With these and other objects in view, the invention resides in the novel construction, combination and arrangement of parts, the essential features of which are hereinafter fully described, are particularly pointed out in the appended claims, and are illustrated in the accompanying drawings, in which:

Figure 1 is a side elevational view of my improved milk bottle holder and lock showing the same in supported position upon a door with a full bottle of milk locked therein.

Figure 2 is a top plan view.

Figure 3 is a vertical sectional view on the line 3—3 of Figure 2, the lock cap being shown in partially raised position in dotted lines.

Figure 4 is a front elevational view.

Figure 5 is an enlarged horizontal sectional view on the line 5—5 of Figure 4.

Figure 6 is a vertical sectional view on the line 6—6 of Figure 5, showing in dotted lines, the position of the parts when a capped bottle of milk is supported by the holder.

Figure 7 is a view similar to Figure 6, but showing a capped bottle of milk in locked engagement with the holder.

Figure 8 is a top plan view showing a multiple type holder.

Referring to the drawings by reference characters, the numeral 10 designates a bracket having a rear flat face adapted to fit against the outer flat side of a door or other support 11, while extending forwardly and upwardly at a slight angle from the bracket 10 is a substantially U-shaped bottle support 12, the opposed sides and rear wall having horizontal flanges 13 extending inwardly therefrom to provide a three point suspension for a milk bottle to be supported. A fastening bolt 14 has its shank portion passing through an opening 15 in the bracket 10 and extending through a registering opening in the door 11 to the inside thereof, the free end of the bolt receiving a clamping nut 16. The head 17 of the bolt is countersunk in a recess 18 provided in the rear wall of the support 12 and is concealed by plugging up the opening 15 with cement, lead, or the like 19. For preventing the holder from turning upon the axis of the bolt 14, the rear flat face of the bracket 10 is provided with one or more spurs 20 which are embedded in the outer face of the supporting structure as illustrated in Figure 3 of the drawings.

Pivoted to the bracket 10 as at 21, is a hollow dome shaped closure cap 22 having a front depending flange 23 for closing the open front of the supporting bracket 12 when the closure cap is in closed position. The closure cap 22 is provided with oppositely extending lips 24, one of which rests upon the support 12, while the other rests upon the top of a lock housing 25 when the closure cap is in closed position, and which lips act as stops for limiting the closing movement of the cap. The lock housing 25 is formed integral with the support 12 and the bracket 10 and is disposed at one side thereof, the rear end of the lock housing 25 terminating flush with the plane of the flat rear face of the bracket 10.

The cap 22 at one side thereof, is provided with a keeper recess 26, the inner side of the same being closed by a plate 27 which is held in position by a vertical post 28, one end of the post being riveted to the plate 27, while the inner end of the post is secured within the top wall of the recess 26. The removable plate 27 is essential to facilitate the insertion of the post 28 and the obstructing member 29. The member 29 includes a flat horizontal plate 30 having an opening 31 for the passage of the post 28, while the outer side of the plate 30 is provided with an upstanding flange 32 which normally closes the outer open side 33 of the keeper recess 26 as shown in Figure 6 of the drawings. Interposed between the top of the keeper recess 26 and the horizontal plate 30 is a spring 34 which surrounds the post 28. Depending from the plate 30 and extending through an opening 35 in the closure plate 27, is an actuating pin 36, the same being disposed out of the path of the walls or bead of a milk bottle when inserted into the holder in a manner to be presently explained.

Slidably mounted for horizontal movement within the lock housing 25 is a latch bolt 37 having a beveled nose 38 at one end and a socket 39 in its opposite end, there being a spring 40 interposed between the end wall of the socket and the adjacent side wall of the lock housing 25. The spring 40 tends to normally extend the nose end of the latch bolt into the keeper recess 26 through the opening 33, but normally when the cap is closed, the flange 29 of the obstructing member prevents extended movement of the latch bolt, thus holding the bolt against the action of the spring 40 and in a retracted position. Extended movement of the latch bolt is limited by the abutment of shoulders 41 and 42 respectively provided on the latch bolt and lock housing.

For the purpose of actuating the latch bolt 37 from an extended locking position to retracted position, I provide a barrel lock 43 which is set in the front of the lock housing 25, the key actuated arm 44 of the lock being movable into the path of a shoulder 45 provided on the under side of the latch bolt 37. Thus by the insertion of the key into the lock 43, the arm 44 may be turned to move the latch bolt 37 to a retracted position.

Means is also provided for actuating the arm 44 from the inside of the door 11, and which includes a stem 46 extending through the door 11, the inner side of the stem being provided with a finger piece 47 to facilitate turning of the stem, while the inner end of the stem enters the lock housing 25 and terminates in a squared portion 48 for reception in the rotatable barrel of the lock on which the actuating arm 44 is mounted. It will now be seen that the lock 43 may be actuated by the proper key from the exterior of the door 11 or freely operable by any one from the inside of the door by merely turning the stem 46.

In practice, assume that the parts are in the position shown in Figure 6 of the drawings, and an empty milk bottle is placed in the holder to be picked up by the milkman and replaced by the full bottle of milk. The operator lifts the cap 22 and slides the neck of the bottle into the U-shaped support 12, whereupon the exterior bead of the bottle rests upon the flanges 13. The cap 22 may now be lowered and if the beveled nose end of the latch bolt 37 is in extended position, it will be forced back to retraced position by the plate 27, thus the open front end of the support 12 is closed by the depending flange 23, but the empty bottle is free to be removed, since the latch bolt obstructing member 29 is still in obstructing position as the actuating pin 36 extends within the neck of the empty bottle.

Upon the removal of the empty bottle by the milkman, and the substitution of a full capped bottle of milk A therefor, a different action takes place. In the drawings the bottle A is shown with a bonnet cap B covering the top mouth of the bottle, although the same result which will now be described may be obtained with a full bottle of milk closed by the ordinary disk type cap.

The neck of the bottle is inserted into the support 12 after the cap 22 has been raised, and the bottle suspended from the flanges 13 on which the bead of the bottle rests. Upon the closing of the cap 22, the actuating pin 36 strikes the top of the cap B of the bottle as shown in Figure 7 of the drawings, and continuous closing movement of the cap causes the upward movement of the obstructing member 29 so as to clear the keeper opening 33, whereupon the beveled nose end of the latch bolt 37 is extended into the keeper opening 40 to overlie the plate 27. At this time, the cap 22 is locked against swinging movement and the bottle of milk cannot be removed by an unauthorized person. By actuating the arm 44 of the lock, either from the inside of the door or by the use of the key from the outside, the lock may be turned to cause the arm 44 to move the latch bolt 37 to retracted position, and as the nose end of the latch bolt clears the keeper opening, the spring 34 will lift the cover 22 to an open position, whereupon the bottle of milk may be lifted from the holder.

In Figure 8 of the drawings is shown a multiple type holder capable of receiving and locking two bottles of milk and the same reference characters refer to like parts therein.

By arranging the support 12 at an upward angle of approximately 2 degrees from the horizontal the bottle has a tendency to remain seated upon the opening of the closure cap 22, otherwise the bottle might accidentally slide from the support as the closure cap is swung open.

The closure cap 22 is made dome shape and hollow to accommodate the upward expansion of the bottle cap should the contents of the bottle expand by reason of becoming frozen during freezing weather.

While I have shown and described what I consider to be the most practical embodiment of my invention, I wish it to be understood that such changes as come within the scope of the appended claims may be resorted to when desired.

Having thus described the invention, what I claim as new and desire to secure by Letters Patent of the United States, is:—

1. A milk bottle holder comprising a supporting bracket, a closure cap pivoted to said supporting bracket and having a keeper recess therein, a locking mechanism mounted in said bracket including a latch bolt for reception in said keeper recess when said closure cap is in closed position, obstructing means acting to normally close said keeper recess against the entrance of said latch bolt, and means operable upon the insertion of a milk bottle into said supporting bracket and the closing of said closure cap for rendering said obstructing means inoperable to facilitate entrance of said latch bolt into said keeper recess.

2. A milk bottle holder comprising a supporting bracket having a recess for laterally receiving the neck of a milk bottle, seat means on the walls of said recess on which the bead of a milk bottle is adapted to rest, a closure cap pivoted to said supporting bracket for closing said recess when the same is in closed position, a keeper recess in one side of said closure cap, a lock mechanism in said supporting bracket including a sliding latch bolt, an obstructing member slidably mounted within said keeper recess, spring means acting upon said obstructing member to normally hold the same in an obstructing position to prevent entrance of said latch bolt therein, and means operable by a milk bottle when inserted into position within said supporting bracket and upon closing of said closure cap for moving said obstructing member to an unobstructing position against the action of said spring means to allow entrance of said latch bolt into said keeper recess.

3. A milk bottle holder comprising a supporting bracket having a recess for laterally receiving the neck of a milk bottle, seat means on the walls of said recess on which the bead of a milk bottle is adapted to rest, a closure cap pivoted to said supporting bracket for closing said recess when the same is in closed position, a keeper recess in one side of said closure cap, a lock mechanism in said supporting bracket including a sliding latch bolt, an obstructing member slidably mounted within said keeper recess, spring means acting upon said obstructing member to normally hold the same in an obstructing position to prevent entrance of said latch bolt therein, and means operable by a milk bottle when inserted into position within said supporting bracket and upon closing of said closure cap for moving said obstructing member to an unobstructing position against the action of said spring means to allow entrance of said latch bolt into said keeper recess, manual actuating means for said locking mechanism for moving said latch bolt to retracted position whereby said spring means will act to return said obstructing member to obstructing position and effect a partial opening movement to said closure cap.

SALVATORE A. DANNA.